United States Patent
Li et al.

(10) Patent No.: US 10,554,034 B2
(45) Date of Patent: Feb. 4, 2020

(54) COLD SHRINKABLE CABLE TERMINAL, COLD SHRINKABLE TERMINAL ASSEMBLY AND METHOD OF TERMINATING CABLE

(71) Applicant: Tyco Electronics (Shanghai) Co. Ltd., Shanghai (CN)

(72) Inventors: Yugang Li, Shanghai (CN); Lizhang Yang, Shanghai (CN); Peng Li, Shanghai (CN); Song Xue, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/815,100

(22) Filed: Nov. 16, 2017

(65) Prior Publication Data
US 2018/0076609 A1 Mar. 15, 2018

Related U.S. Application Data

(63) Continuation of application No. PCT/IB2016/052941, filed on May 19, 2016.

(30) Foreign Application Priority Data

May 19, 2015 (CN) .......................... 2015 1 0255638

(51) Int. Cl.
*H02G 15/064* (2006.01)
*H02G 15/18* (2006.01)
(Continued)

(52) U.S. Cl.
CPC .............. *H02G 15/064* (2013.01); *H02G 1/14* (2013.01); *H02G 15/046* (2013.01);
(Continued)

(58) Field of Classification Search
CPC .. H01B 17/58; H02G 15/064; H02G 15/1826; H02G 15/184; H02G 1/14
See application file for complete search history.

(56) References Cited

U.S. PATENT DOCUMENTS 4,378,463 A * 3/1983 Senior ..................... C08L 71/03
174/73.1
4,383,131 A * 5/1983 Clabburn ............... H02G 15/10
156/49

(Continued)

FOREIGN PATENT DOCUMENTS

EP 0727856 A1 8/1996
WO 2014181212 A2 11/2014
WO WO-2014181212 A2 * 11/2014 ........... H02G 15/064

OTHER PUBLICATIONS

PCT Written Opinion of the International Searching Authority and International Search Report, dated Oct. 10, 2016, 9 pages.

*Primary Examiner* — Timothy J Thompson
*Assistant Examiner* — Rhadames Alonzo Miller
(74) *Attorney, Agent, or Firm* — Barley Snyder (57) ABSTRACT

A cold shrinkable terminal comprises a terminal body fixed to a cable joint disposed at an end of the cable and a composite void filling mastic. The cable joint includes a conductor core, an inner insulation layer disposed on the conductor core, and a conductive shielding layer disposed on the inner insulation layer. The composite void filling mastic covers an incision of the conductive shielding layer and includes a filling layer in contact with the cable joint and a separating layer disposed between the filling layer and the terminal body. The separating layer is made of a material different than the terminal body.

27 Claims, 7 Drawing Sheets

(51) Int. Cl.
*H02G 1/14* (2006.01)
*H02G 15/04* (2006.01)
*H02G 15/184* (2006.01)
*H01B 17/58* (2006.01)

(52) U.S. Cl.
CPC ......... *H02G 15/182* (2013.01); *H02G 15/184* (2013.01); *H02G 15/1826* (2013.01); *H01B 17/58* (2013.01)

(56) References Cited

U.S. PATENT DOCUMENTS

| | | | | |
|---|---|---|---|---|
| 4,589,939 | A * | 5/1986 | Mohebban | H02G 15/08 156/49 |
| 4,685,683 | A * | 8/1987 | Hall | F16J 15/14 138/112 |
| 4,721,832 | A * | 1/1988 | Toy | H01R 4/70 156/49 |
| 4,963,698 | A * | 10/1990 | Chang | H01R 4/70 156/49 |
| 7,901,243 | B1 * | 3/2011 | Yaworski | H01R 4/34 439/523 |
| 8,324,502 | B2 * | 12/2012 | Kameda | H02G 15/24 156/53 |
| 2002/0046865 | A1 * | 4/2002 | Bertini | H01R 4/70 174/84 R |
| 2004/0262025 | A1 * | 12/2004 | Brandt | H02G 15/115 174/88 R |
| 2008/0257259 | A1 * | 10/2008 | Vallauri | H02G 15/1826 118/500 |
| 2010/0181099 | A1 * | 7/2010 | Kameda | H02G 15/1833 174/25 R |
| 2011/0136396 | A1 * | 6/2011 | Burwell | H02G 15/046 439/750 |
| 2012/0181082 | A1 * | 7/2012 | Faulkner | H02G 1/08 174/75 R |
| 2013/0295790 | A1 * | 11/2013 | Cornelius | H01R 4/36 439/359 |
| 2013/0306345 | A1 * | 11/2013 | Wentzel | H01R 4/646 174/93 |
| 2014/0076627 | A1 * | 3/2014 | Maher | H02G 15/064 174/77 R |
| 2014/0262500 | A1 * | 9/2014 | Yaworski | H02G 15/08 174/84 R |
| 2014/0287175 | A1 * | 9/2014 | Krawiec | H01B 3/46 428/36.4 |
| 2014/0315447 | A1 * | 10/2014 | Madden | H02G 15/1826 439/730 |
| 2014/0338953 | A1 * | 11/2014 | Seraj | H01R 4/70 174/138 F |

* cited by examiner

COLD SHRINKABLE CABLE TERMINAL, COLD SHRINKABLE TERMINAL ASSEMBLY AND METHOD OF TERMINATING CABLE

CROSS-REFERENCE TO RELATED APPLICATIONS

This application is a continuation of PCT International Application No. PCT/IB2016/052941, filed on May 19, 2016, which claims priority under 35 U.S.C. § 119 to Chinese Patent Application No. 201510255638.4, filed on May 19, 2015.

FIELD OF THE INVENTION

The present invention relates to a termination of a cable and, more particularly, to a cold shrinkable terminal assembly for terminating a cable.

BACKGROUND

A cable accessory comprising a cold shrinkable terminal and an intermediate joint is an important part of a power transmission cable line. The cold shrinkable terminal is generally applied in a joint of a cable to an electric apparatus, such as a generator, motor, transformer, gas insulation switchgear (GIS), or the like, and the intermediate joint is generally applied in a joint of two cables. The cold shrinkable terminal is used to disperse an electric field at an incision of a conductive shielding layer of the cable and protect the cable from breakdown. The cold shrinkable terminal also prevents moisture and conductive contaminants from entering into an insulation tube and contacting a conductor of the cable, retaining the insulation performance of the joint of the cable and ensuring the long-term safe operation of the cable.

In the prior art, a pre-expanded cold shrinkable terminal for terminating a cable mainly comprises a terminal body, a stress control cone, and an end sealing connection member. The end sealing connection member is hermetically connected to one end of the terminal body. The stress control cone is provided in the terminal body near the other end of the terminal body.

The cable generally comprises a conductor core, an inner insulation layer covered on the conductor core, a conductive shielding layer covered on the inner insulation layer, and an outer sheath layer covered on the conductive shielding layer. Before mounting the cold shrinkable terminal to the cable, one must remove a section of outer sheath layer from the cable to expose a section of conductive shielding layer, remove a part of the exposed conductive shielding layer to expose a section of inner insulation layer, and remove a part of the exposed inner insulation layer to expose a section of conductor core. In this way, a processed cable joint is formed. Then, a layer of grease, for example, silicone oil, is coated on the exposed inner insulation layer of the cable joint. The cold shrinkable terminal is then mounted on the cable joint coated with the layer of grease. After the cold shrinkable terminal is mounted on the cable joint, the grease is filled in a void between the cable joint and the terminal body of the cold shrinkable terminal. The grease filled in the void may effectively reduce the risk of local concentrated discharge and effectively prevent the phenomenon of breakdown.

In another known pre-expanded cold shrinkable terminal, the cold shrinkable terminal comprises a terminal body, a stress control tube provided in the terminal body, and a layer of stress control clay provided in the terminal body. Before mounting the cold shrinkable terminal to a processed cable joint of the cable, the stress control clay and the stress control tube are covered on the exposed conductive shielding layer and the exposed inner insulation layer of the processed cable joint of the cable. In this way, through double layers of stress control material, local concentrated discharge at the processed cable joint of the cable is prevented.

In the prior art, the terminal body of the pre-expanded cold shrinkable terminal is commonly made of silicone rubber material, and a void filling glue containing silicone rubber base material is often used as the stress control clay. As a result, the terminal body and the stress control clay contain the same silicone rubber base material. Since two kinds of materials containing the same base material may affect each other in a case of large expansion ratio, the physical properties of the terminal body may decrease, and the vulcanized terminal body of silicone rubber may easily crack.

SUMMARY

A cold shrinkable terminal according to the invention comprises a terminal body fixed to a cable joint disposed at an end of the cable and a composite void filling mastic. The cable joint includes a conductor core, an inner insulation layer disposed on the conductor core, and a conductive shielding layer disposed on the inner insulation layer. The composite void filling mastic covers an incision of the conductive shielding layer and includes a filling layer in contact with the cable joint and a separating layer disposed between the filling layer and the terminal body. The separating layer is made of a material different than the terminal body.

BRIEF DESCRIPTION OF THE DRAWINGS

The invention will now be described by way of example with reference to the accompanying figures, of which.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 1A:
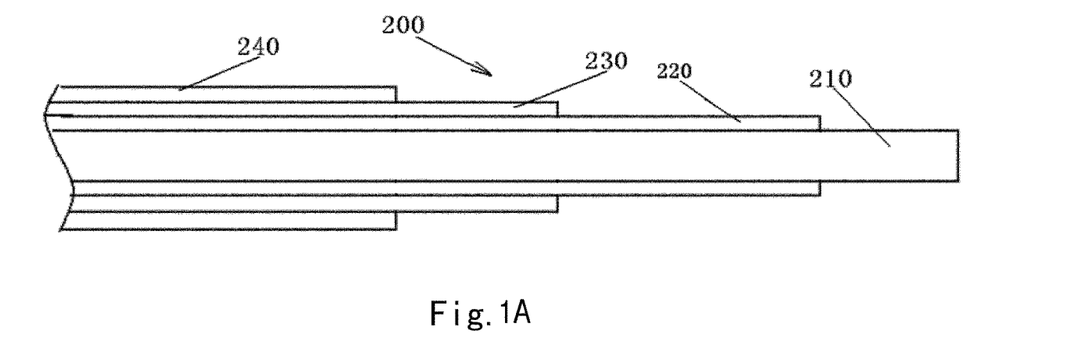
FIG. 1A is a sectional side view of a cable joint of a cable.
Figure 1B:
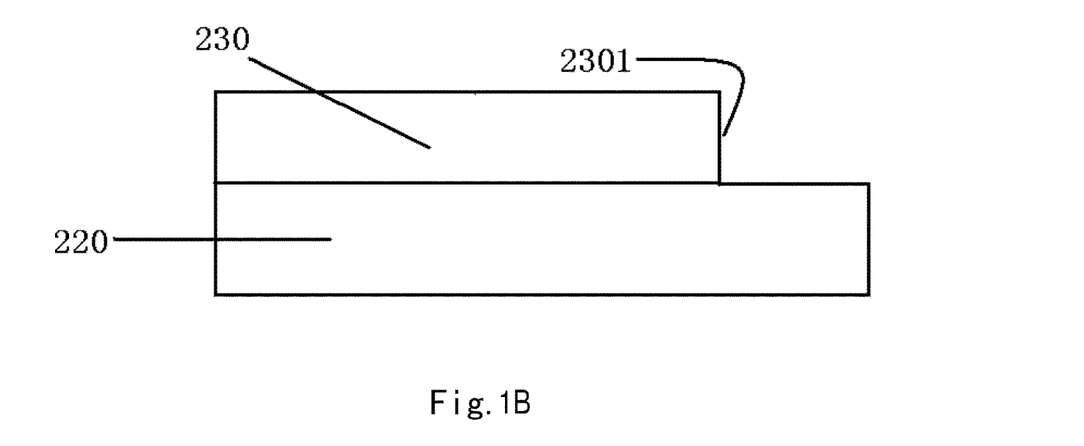
FIG. 1B is an enlarged sectional side view of an exposed conductive shielding layer of the cable joint of FIG. 1A according to an embodiment.
Figure 1C:
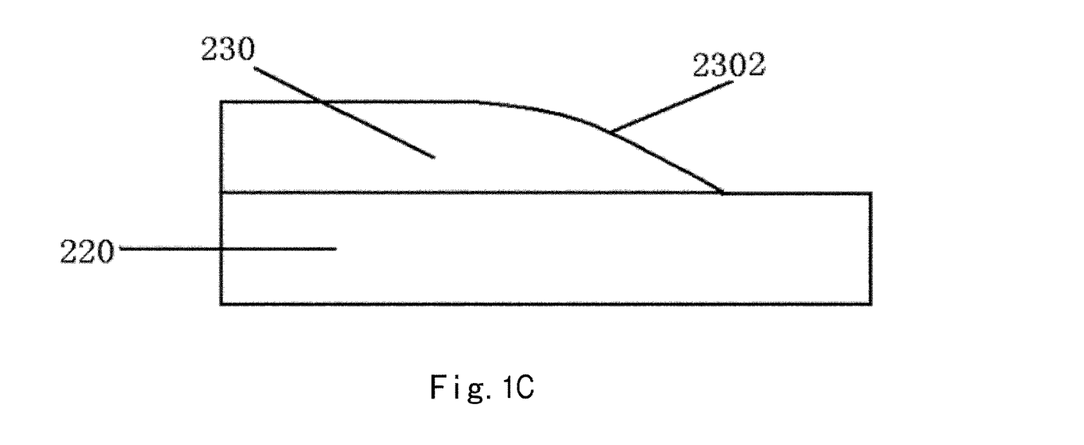
FIG. 1C is an enlarged sectional side view of an exposed conductive shielding layer of the cable joint of FIG. 1A according to another embodiment.

A cable used with the cold-shrinkable cable terminal of the invention is shown in FIGS. 1A-1C. The cable has a cable joint 200 at an end thereof. The cable joint 200 comprises a conductor core 210, an inner insulation layer 220 covered on the conductor core 210, a conductive shielding layer 230 covered on the inner insulation layer 220, and an outer sheath layer 240 covered on the conductive shielding layer 230. In another embodiment, the cable may further comprise a metal shielding layer (see FIG. 9, to be described later) between the conductive shielding layer 230 and the outer sheath layer 240. In an embodiment, the cable is used to transmit a voltage below 110 kV, for example, the cable may be suitable to transmit a voltage of 35 kV, 10 kV, or other suitable value.

Before terminating the cable joint 200, it is necessary to remove a section of outer sheath layer 240 from an end of the cable to expose a section of conductive shielding layer 230, remove a part of the exposed conductive shielding layer 230 to expose a section of inner insulation layer 220, and remove a part of the exposed inner insulation layer 220 to expose a section of conductor core 210. In this way, the resultant cable joint 200 is formed.

As shown in FIG. 1B, in an embodiment, an incision 2301 is formed at an end of the exposed conductive shielding layer 230 by cutting a part of the conductive shielding layer 230. The incision 2301 has a surface substantially perpendicular to the inner insulation layer 220. In another embodiment shown in FIG. 1C, an incision 2302 is formed at an end of the exposed conductive shielding layer 230 by cutting a part of the conductive shielding layer 230. The incision 2302 has a smooth surface inclined with respect to the inner insulation layer 220.

A cold shrinkable terminal 100 according to the invention adapted to be mounted to the cable joint 200 of the cable is shown in FIGS. 2-6. The cold shrinkable terminal 100 comprises a cylindrical terminal body 110 fixed to the cable joint 200 and a composite void filling mastic 300.

Figure 2:
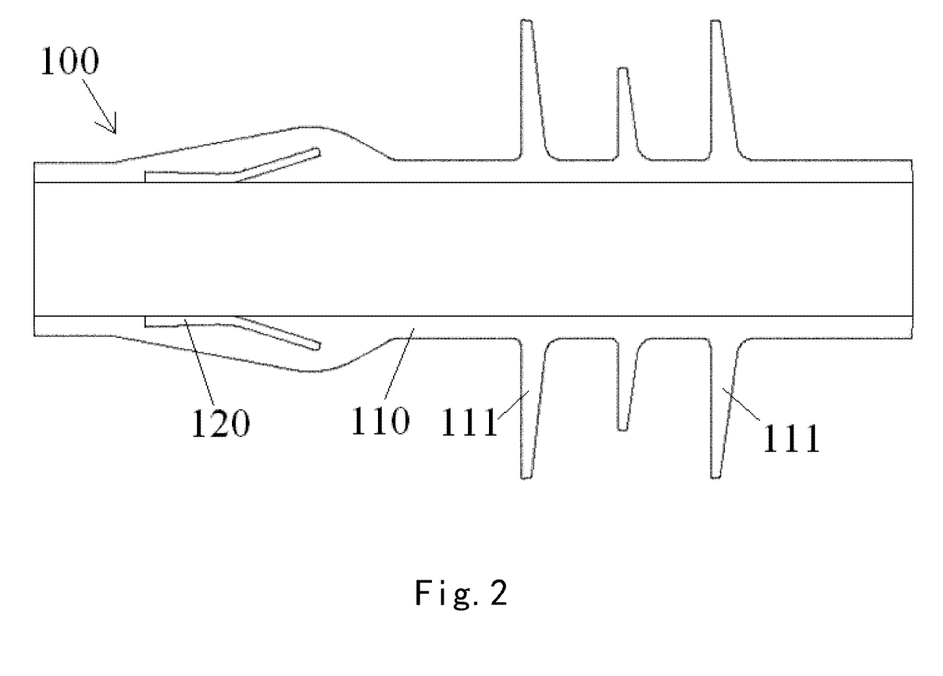
FIG. 2 is a sectional side view of a cold shrinkable terminal according to the invention.

The terminal body 110, as shown in FIG. 2, has a stress control cone 120 disposed in the terminal body 110 and a plurality of flanges 111 protruding outward from the terminal body 110. In an embodiment, the stress control cone 120 and the terminal body 110 are monolithically formed. The stress control cone 120 prevents the phenomenon of electric field concentration and discharge breakdown at the cable joint 200. In an embodiment, the stress control cone 120 and the terminal body 110 are formed of an electrically insulating silicone rubber material and may be molded into a single piece. The flanges 111 increase the creepage distance of the cold shrinkable terminal 100.

Figure 4:
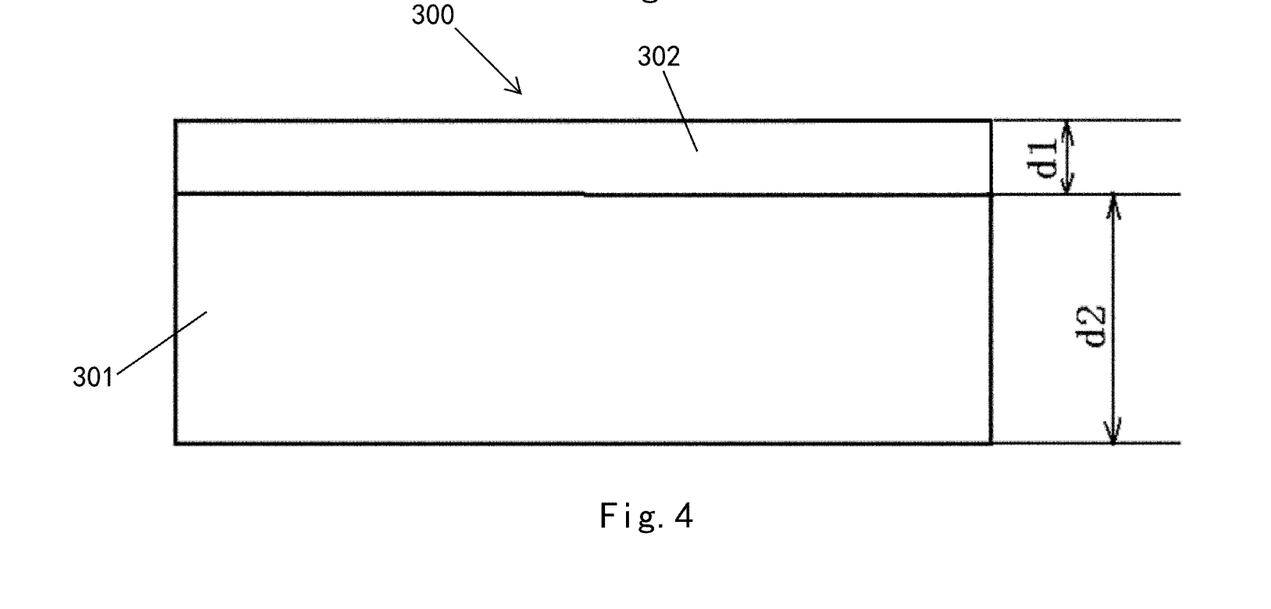
FIG. 4 is an enlarged sectional side view of the composite void filling mastic of FIG. 3.
Figure 5:
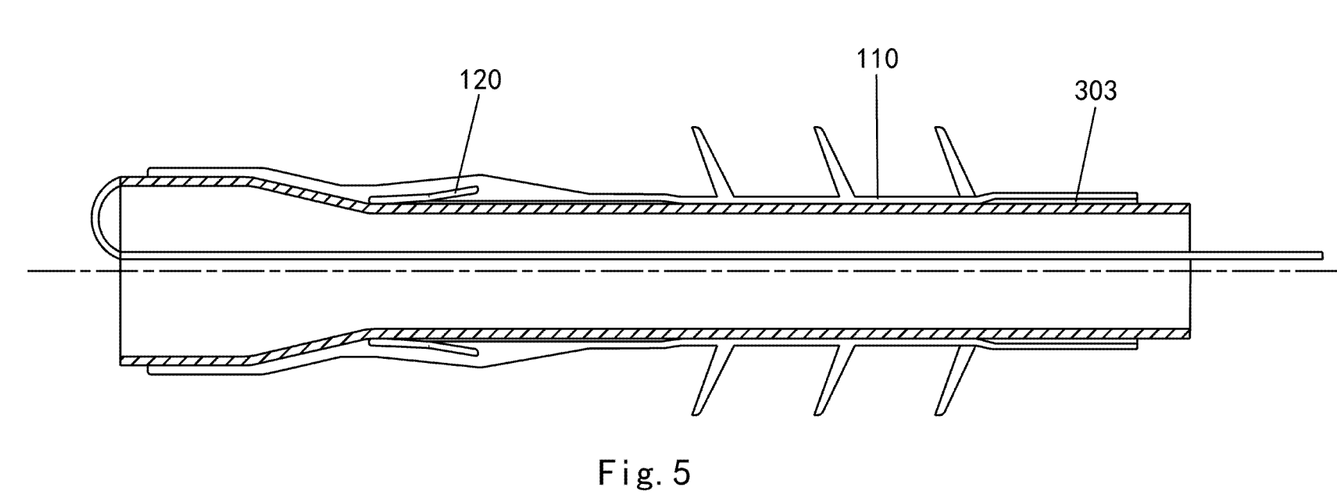
FIG. 5 is a sectional side view of a cold shrinkable terminal assembly according to an embodiment.
Figure 6:
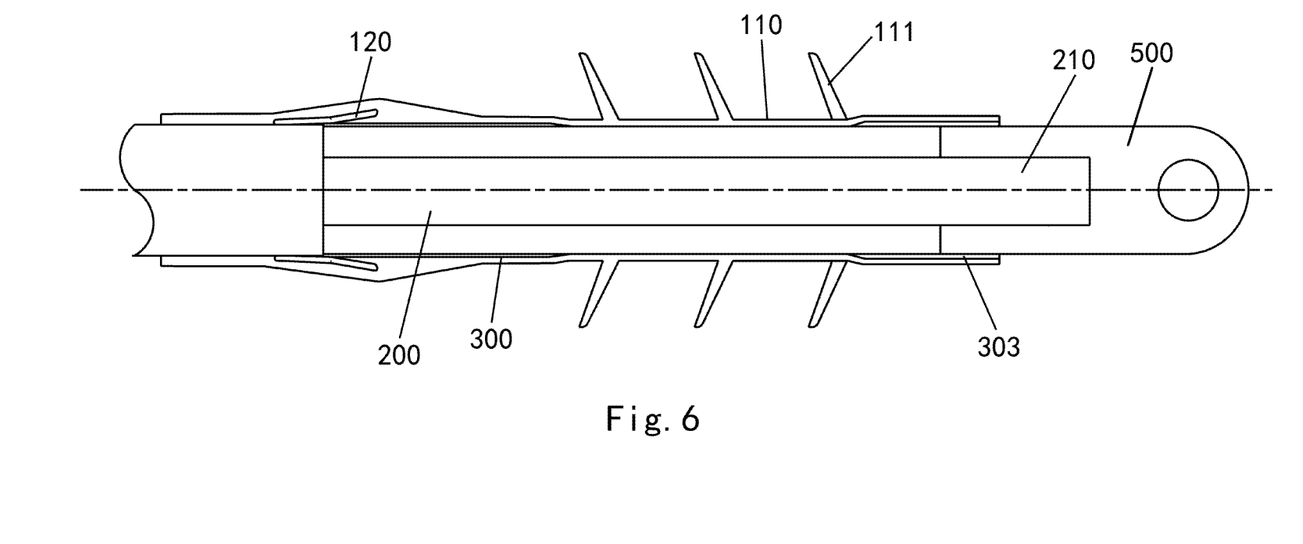
FIG. 6 is a sectional side view of the cold shrinkable terminal of FIG. 2 mounted on the cable joint.

The composite void filling mastic 300, as shown in FIGS. 4-6, comprises a filling layer 301 in contact with the cable joint 200, and a separating layer 302 located between the filling layer 301 and the terminal body 110. The separating layer 302 is made of material different from the terminal body 110. The composite void filling mastic 300 covers an incision 2301, 2302 of the exposed conductive shielding layer 230.

As shown in FIGS. 1A-1C and 6, the filling layer 301 covers the incision 2301 of the conductive shielding layer 230 and may be filled in a void between the terminal body 110 and the inner insulation layer 220 at the incision 2301 of the conductive shielding layer 230, so as to control the electric field near the incision 2301, effectively reducing the local discharge, and preventing the breakdown phenomenon. In an embodiment, the separating layer 302 has a width larger than a width of the filling layer 301 in an axial direction, so as to completely isolate the terminal body 110 from the filling layer 301 by the separating layer 302. The composite void filling mastic 300 covers a part of the exposed conductive shielding layer 230 and at least a part of the exposed inner insulation layer 220.

The separating layer 302 may be made of rubber material based hydrocarbon. For example, the separating layer 302 may be made of at least one of ethylene propylene diene monomer (EPDM), thermoplastic ethylene propylene rubber, polyisobutylene, and polyisoprene. The filling layer 301 may be made of material comprising silicon rubber, the same material as the terminal body 110, and the filling layer 301 may have a dielectric constant within a range of 10-50. The filling layer 301 has a thickness d1 within a range of 0.01-1 mm, the separating layer 302 has a thickness d2 within a range of 0.01-0.5 mm. When the terminal body 110 and stress control cone 120 are monolithically formed, the filling layer 301 is made of material comprising silicon rubber, and the filling layer 301 may have a dielectric constant within a range of 3-50, and in an embodiment within a range of 3.5-16. In an embodiment, the plastic value of the filling layer 301 measured at 70° C. in accordance with GB/T 12828-2006 standard is less than 600. The GB/T 12828-2006 standard refers to a standard of "Rubber, raw and unvalcanized compounded-Determination of plasticity number and recovery number-Parallel plate method" distributed on Dec. 29, 2006 and implemented on Jun. 1, 2007 by General Administration of Quality Supervision, Inspection and Quarantine of the People's Republic of China and China National Standardization Management Committee.

Since the separating layer 302 is made of material different from that of the terminal body 110, it prevents the filling layer 301 from contacting the terminal body 110 made of silicone rubber material, effectively preventing the physical properties of the terminal body 110 from being reduced due to the swelling of the terminal body 110 caused by the filling layer 301 and eliminating the risk of the cracking of the terminal body 110.

The filling layer 301 of the composite void filling mastic 300 deforms upon being pressed. The filling layer 301 fills in a gap at a step formed by the incision 2301, 2302 of the conductive shielding layer 230 or at any other location between the terminal body 110 and the cable joint 200 and effective eliminates the air from the gap when the terminal body 110 is mounted on the cable joint 200. The filling layer 301 has a dielectric constant larger than the inner insulation layer 220 and may disperse the electric field, decreasing the electric field strength at the incision 2301, 2302 of the conductive shielding layer 230 and the surface of the inner insulation layer 220, preventing the local concentrated discharge at the cable joint 200 and improving the safety of the operation of the cable. The separating layer 302 eliminates the risk of the cracking of the terminal body 110 and prevents the local concentrated discharge near the incision 2301, 2302 of the conductive shielding layer 230.

As shown in FIG. 6, in an embodiment, after the cold shrinkable terminal 100 is mounted on the cable joint 200, a metal connection terminal 500 may be mounted. One end of the metal connection terminal 500 is inserted into a support tube 400 (to be described in detail later) from one end of the support tube 400 opposite to the cable joint 200 and electrically connected to the exposed conductor core 210 of the cable joint 200. In an embodiment, the metal connection terminal 500 may be electrically connected to the conductor core 210 of the cable joint 200 by crimping or bolting. The metal connection terminal 500 is fitted with the terminal body 110 of the cold shrinkable terminal 100 in a sealing manner.

A sealant 303, as shown in FIG. 6, is disposed between an outer surface of the metal connection terminal 500 and the terminal body 110 at a location where the metal connection terminal 500 is connected to the conductor core 210. The sealant 303 effectively prevents rain or moisture from entering into the cold shrinkable terminal 100 through an interface between the terminal body 110 and the metal connection terminal 500.

Figure 3:
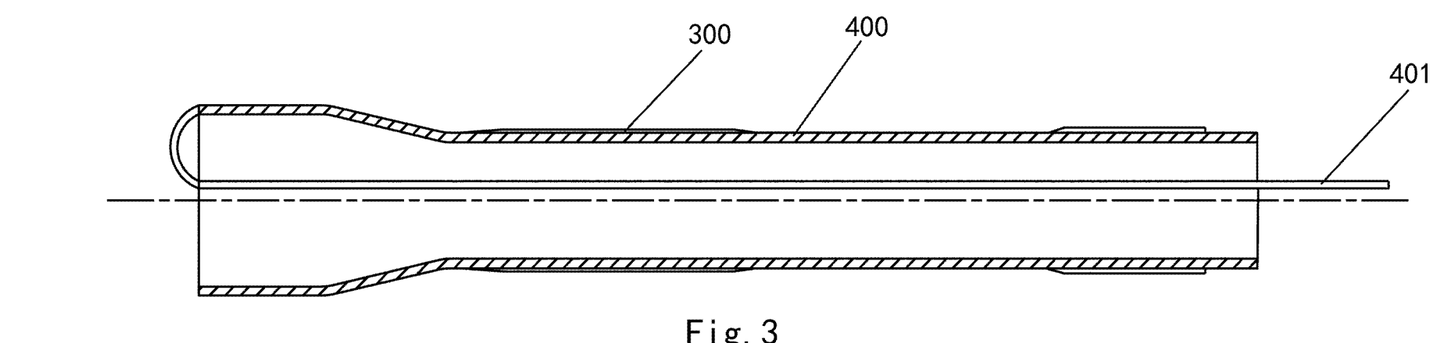
FIG. 3 is a sectional side view of a support tube on which a composite void filling mastic of the cold shrinkable terminal of FIG. 2 is disposed.

A cold shrinkable terminal assembly for terminating the cable and manufacturing the cable terminal of FIG. 6 is shown in FIGS. 2-5. The cold shrinkable terminal assembly comprises the cold shrinkable terminal 100 and a support tube 400. The terminal body 110 is pre-expanded on the support tube 400 on which the composite void filling mastic 300 is preset, as shown in FIG. 3. The composite void filling mastic 300 as described above at least covers an incision 2301 of the exposed conductive shielding layer 230 after the cold shrinkable terminal 100 is fixed to the cable joint 200.

The support tube 400 may be an irregular shaped tube, for example, having portions with different diameters; as shown in FIG. 3, the support tube 400 comprises a tapered tube portion with a gradient diameter and a cylindrical portion with a constant diameter. In an embodiment, the support tube 400 is formed as a spiral support tube by winding a strip made of Polyethylene (PE) or Polypropylene (PP) into a spiral tube. The spiral support tube 400 comprises a rope 401 extending from a first end to a second end of the spiral support tube inside the spiral support tube. The spiral support tube may be unwound and detached by pulling the rope 401 from the second end of the spiral support tube.

The cold shrinkable terminal 100 may be pre-expanded on the support tube 400 provided with the composite void filling mastic 300 in the factory, so that the cold shrinkable terminal assembly is obtained. The position of the cold shrinkable terminal 100 and the position of the composite void filling mastic 300 are relatively fixed after expanding the cold shrinkable terminal 100.

To mount the cold shrinkable terminal 100 on the cable joint 200, the cable joint 200 is directly inserted into the support tube 400 of the cold shrinkable terminal assembly shown in FIG. 5 and the support tube 400 is then detached by pulling the rope 401 from the second end of the spiral support tube. The composite void filling mastic 300 does not need to be coated on the cable joint 200 at an installation site, simplifying the installation procedures at the site, increasing the installation efficiency of the cold shrinkable terminal 100, realizing the quick and easy installation of the cold shrinkable terminal 100, and improving the electrical performance of the cold shrinkable terminal assembly.

A method of terminating a cable will now be described in greater detail with reference to FIGS. 2-6. The method of terminating the cable is a method of forming a cable terminal by mounting the cold shrinkable terminal 100 on the cable joint 200 of the cable.

The method of terminating the cable mainly comprises steps of:

S100: providing a support tube 400 and providing a composite void filling mastic 300 on a section of an outer wall of the support tube 400, as shown in FIG. 3. The filling layer 301 contacts an outer wall of the support tube 400 and the separating layer 302 covers the filling layer 301;

S200: pre-expanding a terminal body 110 of a cold shrinkable terminal 100 on the support tube 400 on which the composite void filling mastic 300 is preset, as shown in FIG. 5;

S300: inserting a cable joint 200, from which a section of conductive shielding layer 230 and a section of inner insulation layer 220 are removed, of the cable into the support tube 400; and S400: detaching the support tube 400, so that the terminal body 110 of the cold shrinkable terminal 100 is shrunk on the cable joint 200 of the cable and the composite void filling mastic 300 at least covers an incision 2301 of the exposed conductive shielding layer 230, as shown in FIG. 6.

In an embodiment in which the cable terminal comprises a metal connection terminal 500, the above method may further comprise a step of S310 between the step S300 and the step S400.

S310: providing the metal connection terminal 500, wherein one end of the metal connection terminal 500 is inserted into the support tube 400 from one end of the support tube 400 opposite to the cable joint 200 and electrically connected to the exposed conductor core 210 of the cable joint 200. The metal connection terminal 500 may be electrically connected to the conductor core 210 of the cable joint 200 by crimping or bolting.

In an embodiment, the step S100 may further comprise a step of: providing a sealant 303 on an outer wall of the other end of the support tube 400, the sealant 303 located between an outer surface of the metal connection terminal 500 and the terminal body 110 at a location where the metal connection terminal 500 is connected to the conductor core 210 after the support tube 400 is detached. During expanding the cold shrinkable terminal 100 onto the support tube 400 provided with the sealant 303, the other end of the support tube 400 on which the sealant 303 is provided should be placed at the one end of the cold shrinkable terminal 100 opposite to the cable joint 200. The sealant 303 may effectively prevent rain or moisture from entering into the cold shrinkable terminal 100 through an interface between the terminal body 110 and the metal connection terminal 500.

Figure 7:
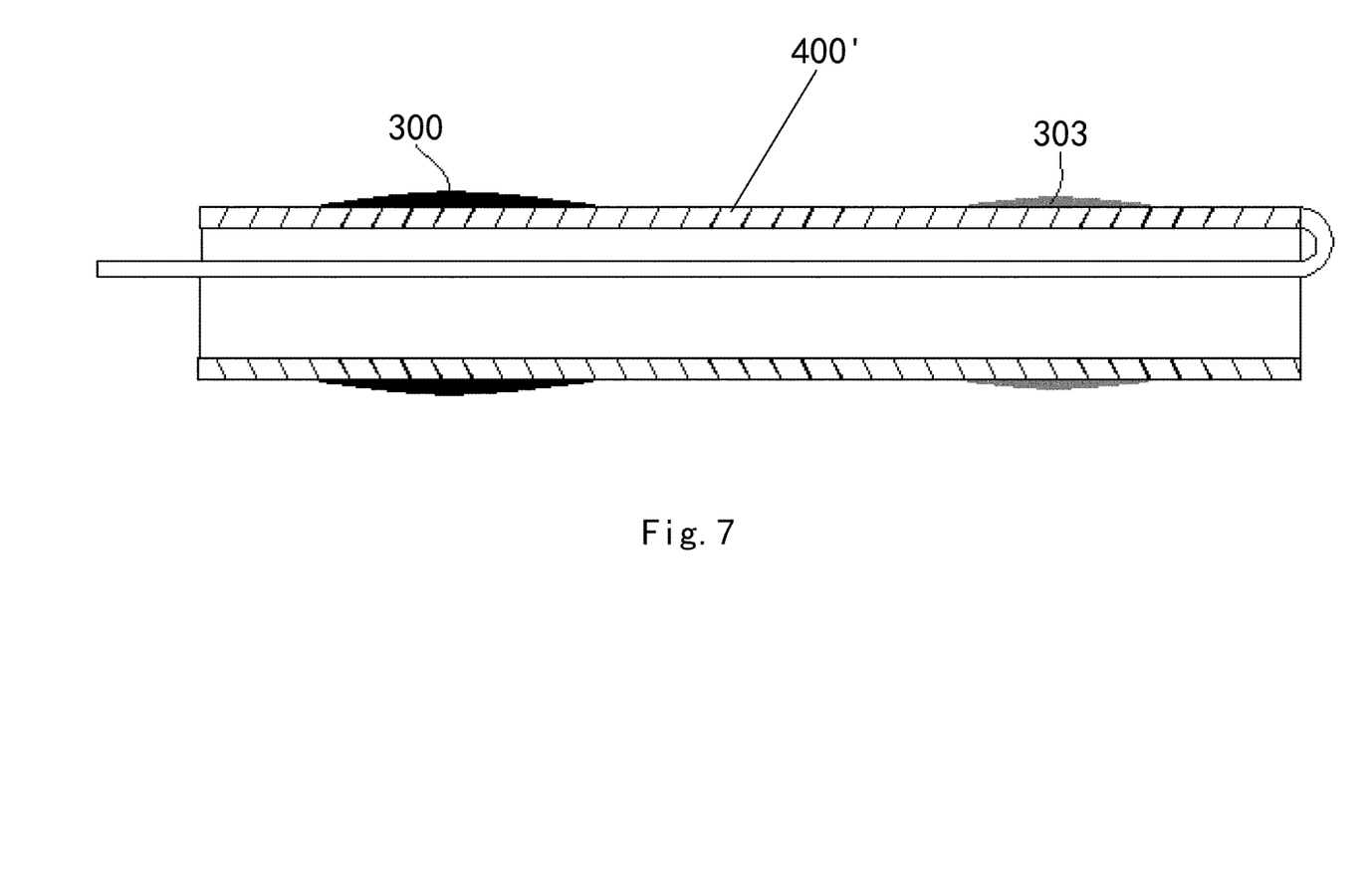
FIG. 7 is a sectional side view of a support tube on which a composite void filling mastic is disposed according to another embodiment.
Figure 8:
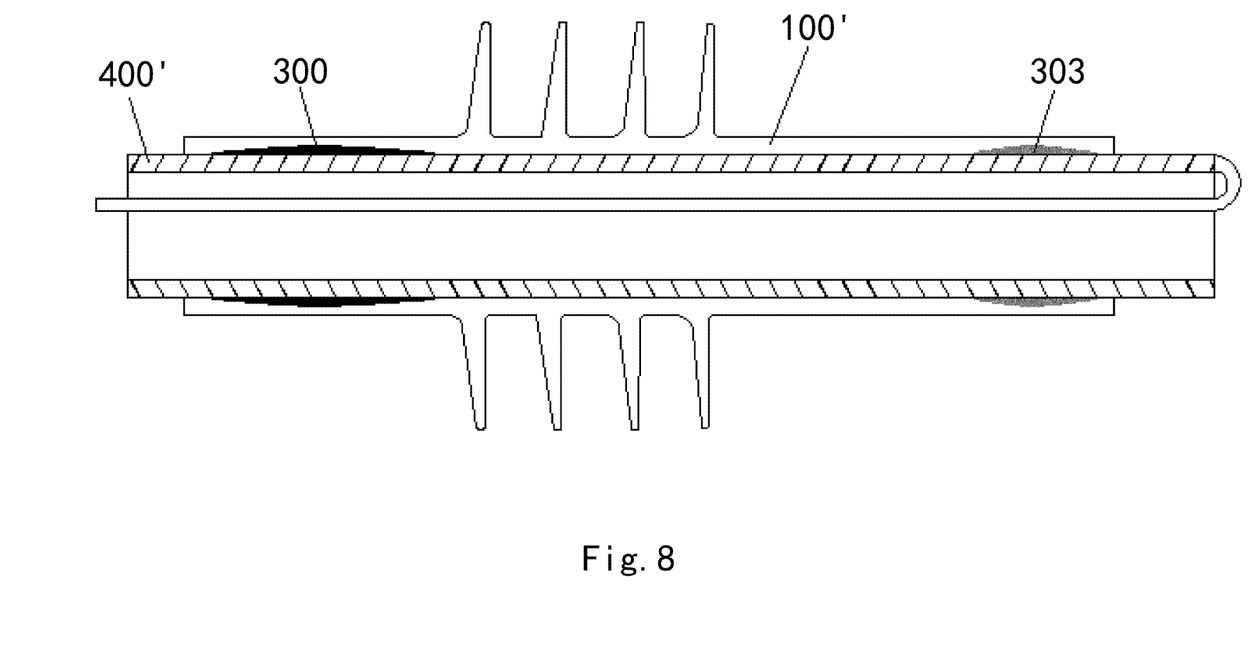
FIG. 8 is a sectional side view of a cold shrinkable terminal assembly including a cold shrinkable terminal according to another embodiment.
Figure 9:
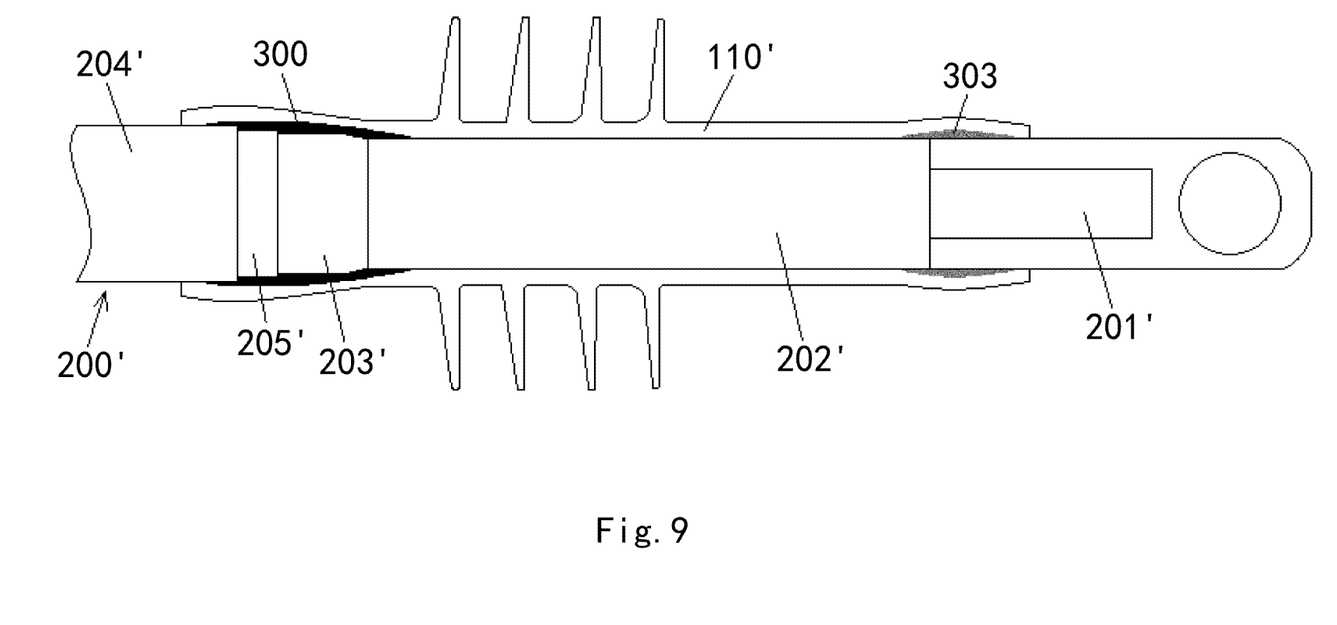
FIG. 9 is a sectional side view of the cold shrinkable terminal of FIG. 8 mounted on the cable joint.

The above described support tube 400 has portions with variable outer diameters, but the present invention is not limited to this. FIGS. 7-9 shows a support tube 400' according to another embodiment.

As shown in FIG. 7, the support tube 400' has a cylindrical structure with a constant outer diameter. The composite void filling mastic 300 and the sealant 303 are pre-provided on a predetermined location on the outer wall of the support tube 400'. The composite void filling mastic 300 comprises the filling layer 301 and the separating layer 302 as described in the embodiment of FIGS. 2-6. As shown in FIGS. 8 and 9, a cold shrinkable terminal 100' of the embodiment shown in FIGS. 7-9 does not include the stress control cone 120 of the cold shrinkable terminal 100. The other features of the support tube 400' and the cold shrinkable terminal 100' are substantially the same as the support tube 400 and cold shrinkable terminal 100 and descriptions of them are omitted herein.

As shown in FIG. 9, the cable comprises a conductor core 201', an inner insulation layer 202' covered on the conductor core 201', a conductive shielding layer 203' covered on the inner insulation layer 202', a metal shielding layer 205' covered on the conductive shielding layer 203', and an outer sheath layer 204' covered on the metal shielding layer 205'. Before terminating the cable, one must remove a section of outer sheath layer 204' from an end of the cable to expose a section of metal shielding layer 205', remove a part of the exposed metal shielding layer 205' to expose a section of conductive shielding layer 203', remove a part of the exposed conductive shielding layer 203' to expose a section of inner insulation layer 202', and remove a part of the exposed inner insulation layer 202' to expose a section of conductor core 201'. In this way, a processed cable joint 200' is formed.

What is claimed is:

1. A cold shrinkable terminal, comprising:
a terminal body fixed to a cable joint disposed at an end of a cable, the cable joint including a conductor core, an inner insulation layer disposed on the conductor core, and a conductive shielding layer disposed on the inner insulation layer; and
a composite void filling mastic covering an incision of the conductive shielding layer and including a filling layer in contact with the cable joint and a separating layer disposed between the filling layer and the terminal body, the separating layer made of a material different than the terminal body, the separating layer having a width being larger than a width of the filling layer in an axial direction and isolating the terminal body from the filling layer.

2. The cold shrinkable terminal of claim 1, wherein the separating layer is made of a rubber material base hydrocarbon.

3. The cold shrinkable terminal of claim 1, wherein the separating layer is made of at least one of: ethylene propylene diene monomer, thermoplastic ethylene propylene rubber, polyisobutylene, and polyisoprene.

4. The cold shrinkable terminal of claim 1, wherein the filling layer is made of a material comprising silicon rubber and has a dielectric constant within a range of 10-50.

5. The cold shrinkable terminal of claim 1, wherein the filling layer has a thickness within a range of 0.01-1 mm and the separating layer has a thickness within a range of 0.01-0.5 mm.

6. The cold shrinkable terminal of claim 1, further comprising a stress control cone disposed in the terminal body, the stress control cone and the terminal body monolithically formed.

7. The cold shrinkable terminal of claim 6, wherein the filling layer is made of a material comprising silicon rubber and has a dielectric constant within a range of 3.5-16.

8. A cold shrinkable terminal assembly, comprising:
a support tube; and
a cold shrinkable terminal including a composite void filling mastic disposed on the support tube and a terminal body pre-expanded on the support tube over the composite void filling mastic and capable of being fixed to a cable joint disposed at an end of a cable, the composite void filling mastic including a filling layer in contact with an outer wall of the support tube and a separating layer disposed between the filling layer and the terminal body and made of a material different than the terminal body, the separating layer having a width being larger than a width of the filling layer in an axial direction and isolating the terminal body from the filling layer.

9. The cold shrinkable terminal assembly of claim 8, wherein the separating layer is made of a rubber material base hydrocarbon.

10. The cold shrinkable terminal assembly of claim 9, wherein the separating layer is made of at least one of: ethylene propylene diene monomer, thermoplastic ethylene propylene rubber, polyisobutylene, and polyisoprene.

11. The cold shrinkable terminal assembly of claim 8, wherein the filling layer is made of a same material as the terminal body.

12. The cold shrinkable terminal assembly of claim 8, wherein the filling layer is made of a material comprising silicon rubber and has a dielectric constant within a range of 10-50.

13. The cold shrinkable terminal assembly of claim 8, wherein the filling layer has a thickness within a range of 0.01-1 mm and the separating layer has a thickness within a range of 0.01-0.5 mm.

14. The cold shrinkable terminal assembly of claim 8, wherein the cold shrinkable terminal has a stress control cone disposed in the terminal body, the stress control cone and the terminal body monolithically formed.

15. The cold shrinkable terminal assembly of claim 14, wherein the filling layer is made of a material comprising silicon rubber and has a dielectric constant within a range of 3.5-16.

16. The cold shrinkable terminal assembly of claim 8, wherein the support tube is a straight tube or an irregular shaped tube.

17. The cold shrinkable terminal assembly of claim 8, further comprising a sealant disposed on the outer wall of the support tube and positioned to correspond with the end of the cable.

18. A method of terminating a cable, comprising the steps of:
providing a support tube with a composite void filling mastic on a section of an outer wall of the support tube, the composite void filling mastic including a filling layer in contact with the outer wall of the support tube and a separating layer disposed on the filling layer;
pre-expanding a terminal body of a cold shrinkable terminal on the support tube on which the composite void filling mastic is preset, the separating layer of the composite void filling mastic made of a material different from the terminal body, the separating layer having a width being larger than a width of the filling layer in an axial direction and isolating the terminal body from the filling layer;
inserting a cable joint of the cable, from which a section of conductive shielding layer and a section of inner insulation layer are removed, into the support tube; and
detaching the support tube so that the terminal body of the cold shrinkable terminal is shrunk on the cable joint of the cable, the composite void filling mastic at least covering an incision of the conductive shielding layer.

19. The method of claim 18, wherein the separating layer is made of at least one of: ethylene propylene diene monomer, thermoplastic ethylene propylene rubber, polyisobutylene, and polyisoprene.

20. The method of claim 18, wherein the filling layer is made of a same material as the terminal body.

21. The method of claim 18, further comprising inserting an end of a metal connection terminal into the support tube from an end of the support tube opposite to the cable joint and electrically connecting the metal connection terminal to a conductor core of the cable joint.

22. The method of claim 21, wherein the metal connection terminal is electrically connected to the conductor core by crimping or bolting.

23. The method of claim 21, wherein the providing step further includes providing a sealant on the outer wall of the support tube at an end of the support tube opposite the composite void filling mastic, the sealant disposed between an outer surface of the metal connection terminal and the terminal body at a location where the metal connection terminal is connected to the conductor core after the support tube is detached.

24. The cold shrinkable terminal of claim 1, wherein the incision is provided at an end of the conductive shielding layer and exposing the conductive shielding layer.

25. The cold shrinkable terminal of claim 24, wherein the incision has a surface substantially perpendicular to the inner insulation layer.

26. The cold shrinkable terminal of claim 24, wherein the incision has a smooth surface inclined with respect to the inner insulation layer.

27. The cold shrinkable terminal of claim 1, wherein the filling layer has a dielectric constant larger than a dielectric constant of the inner insulation layer.

* * * * *